July 13, 1937.                W. FRIEDRICH                2,086,711
APPARATUS FOR PRODUCING FIRE EXTINGUISHING FOAM
Filed May 27, 1935                    2 Sheets—Sheet 1
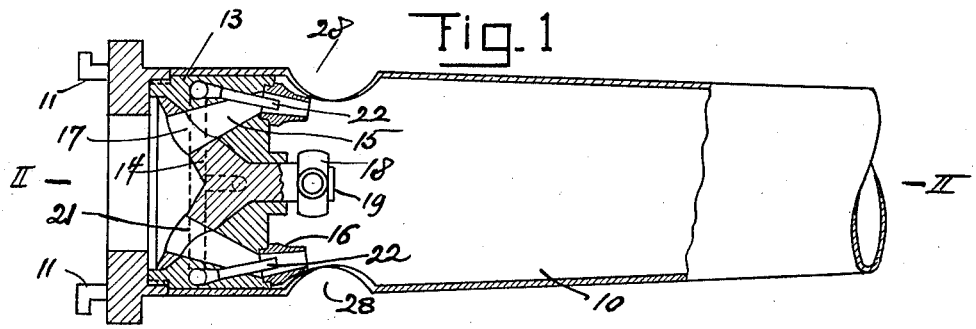
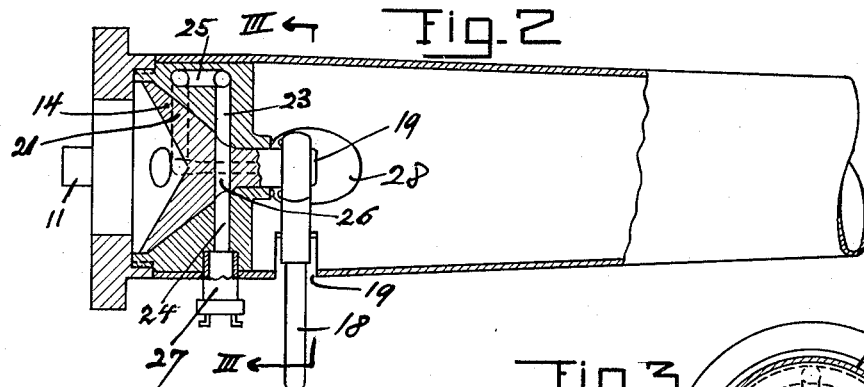
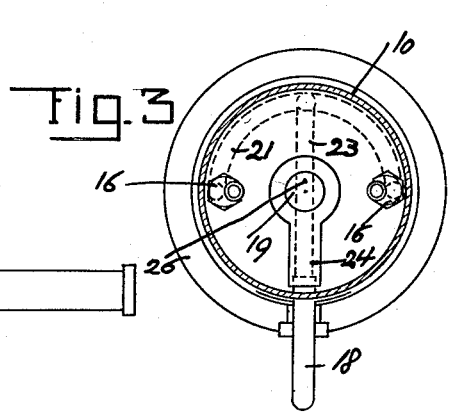
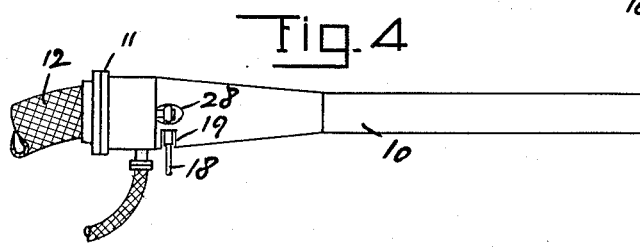
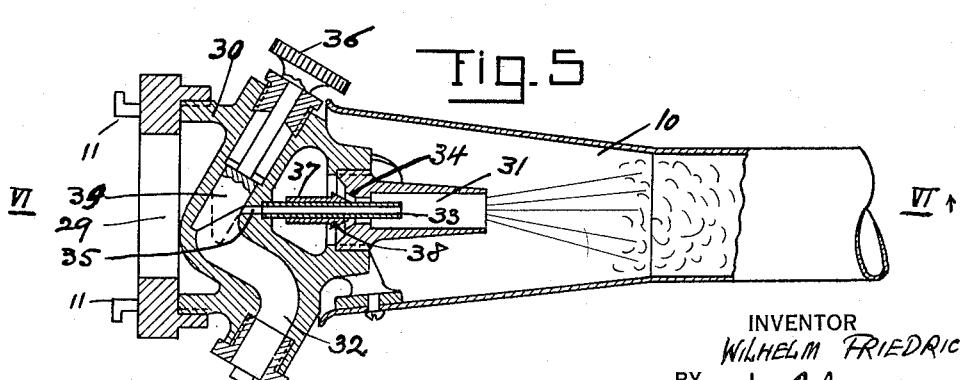
INVENTOR
WILHELM FRIEDRICH
BY
ATTORNEY

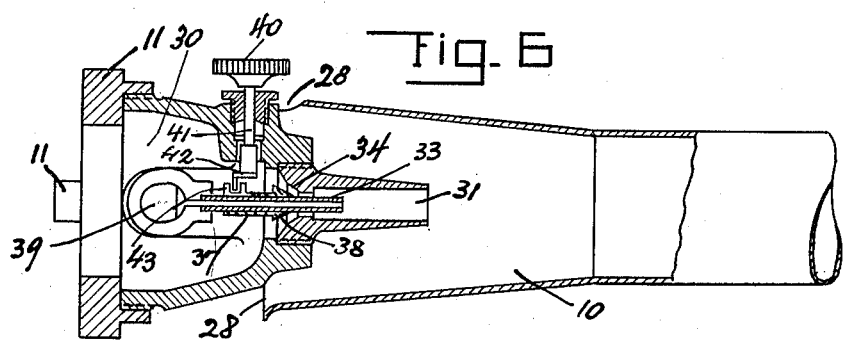
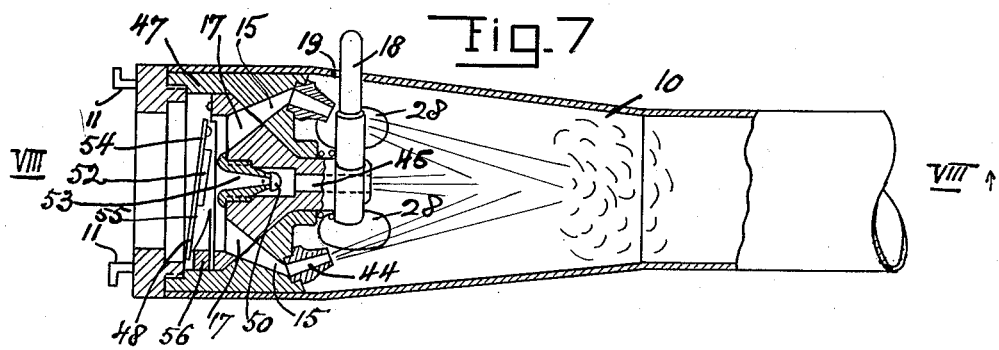
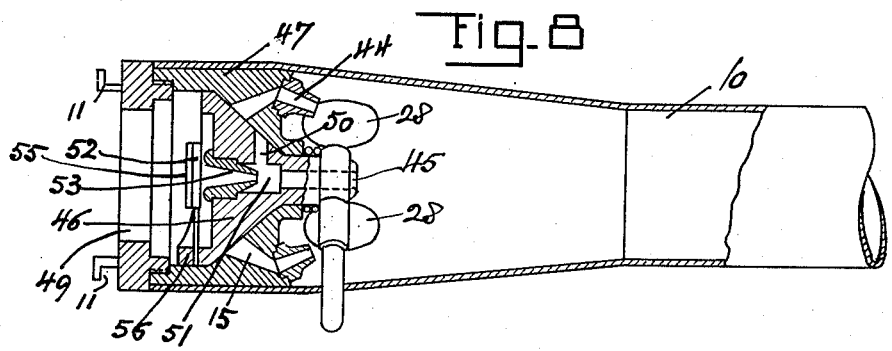
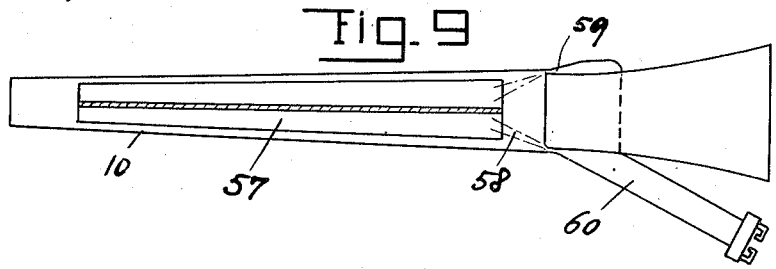

Patented July 13, 1937

2,086,711

UNITED STATES PATENT OFFICE 2,086,711

APPARATUS FOR PRODUCING FIRE EXTINGUISHING FOAM

Wilhelm Friedrich, Berlin-Charlottenburg, Germany

Application May 27, 1935, Serial No. 23,551
In Germany December 13, 1932

4 Claims. (Cl. 261—116)

This invention refers to improvements in apparatuses adapted to generate air foam by the use of water under pressure supplied by a fire engine, or pump, or other suitable means or sources.

In my co-pending patent application, Serial No. 701,069 filed on December 5, 1933, issued as U. S. Patent No. 2,003,184 on May 28, 1935. I described an apparatus and process adapted to generate air foam.

This application refers to some improvements of the invention described in my said co-pending application. This foam generator consists of an apparatus in which water under pressure enters under conditions causing turbulence in it. The water contains a foam forming agent (i. e.—a chemical substance) and, upon mixing with air entering the apparatus, foam is produced which is directed to the seat of the fire.

It is further necessary for the total cross section of the foam outlet to be many times as large as the cross section of the liquid's inlet. As for the production of foam, about 8 to 15 volumes of air are required per volume of water and a high ratio of cross-section of the air-inlet to the water inlet is necessary.

It has also been found advantageous for the interior of the foam generator in which the foam is produced to be of conical form narrowing in the direction of the flow.

It has also been found that for good results in foam formation, the properties of the foam forming agent are not unimportant. By way of example the following foam formers have been found advantageous: sulphonates of fatty alcohols, salts of aromatic alkylated sulpho acids and salts of alkylnaphthalin sulpho-acids.

The above described foam generator is particularly adapted for interposition in the suction pipe of a pressure pump. But in another form it can be used as a nozzle set upon the end of the hose, the water under pressure supplied by the fire engine pump having the foam former added at any suitable place.

It has already been proposed to produce air foam by means of a jet of liquid having foam former added to it, which in a jet pump sucks in air and works it into foam. The use of a water jet pump is not at all suitable for obtaining the desired results. Water jet pump works with a single solid water jet which flows through a narrow nozzle. Since the turbulence produced by a powerful solid water jet is too small and since too little air is sucked in (about 1 to 1½ volume of air to 1 volume of water), such a jet pump does not yield foam suitable for fire fighting. Only with the present invention is an air foam with sufficient toughness, stiffness and fineness of the bubbles produced.

In the drawings several embodiments of the invention are described by way of example.

Fig. 1 shows an apparatus partly in cross section and with its ends broken away, Fig. 2 shows in the same way a cross section along line II—II in Fig. 1, Fig. 3 shows a cross section along the line III—III in Fig. 2, Fig. 4 shows a side elevation of this apparatus. Fig. 5 shows another embodiment of the invention in cross section with parts broken away, Fig. 6 a section along line VI—VI in Fig. 5. Fig. 7 shows another embodiment of the invention in cross section with parts broken away, Fig. 8 a cross section along the line VIII—VIII in Fig. 7. Fig. 9 shows more diagrammatically a cross section through a foam producer according to the invention.

In the drawings, the same reference numbers have identical significance.

In Figs. 1, 2, 3, 4—10 is a tube being conical on its entrance side and approximately cylindrical toward its other end. The entrance side is provided with coupling means 11, adapted to connect the tube with a hose 12 through which water under pressure from any pipe line may enter the tube. Within the entrance end, the casing 13 of a rotatable lid 14 is arranged, provided with a number of passages 15. On one end of these passages nozzles 16 are arranged while the other ends run into the front of the rotatable valve 14. In this valve openings 17 are provided corresponding to the passages 15 in the casing. A handle 18 is connected to the axis 19 of the cock and emerges through a slit 20, so that the cock may be opened or closed by turning the handle 18. Within the casing 13 a channel 21 is provided connected with tubes 22, running into the nozzle 16. Other channels 23, 24 are provided in the casing and connected at 25 with the channel 21. A passage 26 is provided in the valve 14 and is in alignment with the two channels 23, 24, if the cock is turned in the position shown in which the openings 17 are in alignment with the passages 15. If turning the cock by means of the handle 18, the passage 26 gets out of alignment with the channels 23, 24. Channel 24 is connected to coupling means 27 for connection with a supply of a solution containing a foam promoting agent.

In operation, the handle and the cock being in the position shown, water under pressure enters the tube and flows through the openings 17 and passages 15 into the nozzle 16 wherefrom jets of water result entering the inside of tube 10 and impinging upon each other whereby turbulence is created. The water enters the mouth of the valve 14 under the pressure of the pipe line, and this pressure is transformed into velocity when the water is driven through the passages 15 and nozzles 16. The full pressure in the water acts therefore upon the valve 14 and presses it against its seat in the casing 13. The water passing the nozzles 16 with relatively high velocity sucks in the foam promoting solution through the tubes or nozzles 22. By turning the handle 18 the amount of water entering the passages 15 may be regulated and, if the cock is turned at a sufficient angle the entire influx of water may be stopped. In this case the water presses the cock with full pressure against its seat whereby the tight closing of the valve is secured. In the same way, the influx of the foam promoting agent containing solution may be choked. In order to avoid, however, any interruption of the admission of the foam promoting agent while water may still enter the holes 15, it is advisable to give the passage 26 an oblong cross section so that it establishes full communication between the channels 23, 24 in any position of the cock 14 in which a communication, open or more or less choked, is established between the passages 15 and the entering water through the openings 17. Air in the desired amount is sucked into the tube through the slots 28. On the other hand, if a regulation is wanted of the amount of foam promoting agent containing solution without regulating the amount of water admitted into the tube, the openings 17 may be made of oblong cross section, while the passage 26 may be of circular cross section. Then by slightly turning the cock 14 the amount of the solution crossing the channel 26 can be regulated at will, while the amount of water passing the opening 17 to the opening 15 remains unchanged.

In the embodiment of the invention according to Figs. 5, 6 water enters again at 29 into the casing 30 and passes to the single nozzle 31, being constructed so as to impart turbulence to the water. The solution containing the foam promoting agent enters a channel 32 being connected to the inside of a nozzle-tube 33. A rotatable valve 39 is arranged in front of a hole 35 establishing the connection between the tube 33 and the channel 32. The valve 39 consists of a cylindrical part fitting the inner end of channel 32 and being cut so that in the position shown in Fig. 3, the solution may enter the hole 35 while, after turning the valve 39 by handle 36 by 180° in the position shown in dotted lines, the entrance to the hole 35 is closed. In the intermediate positions, some choking of the amount of solution entering the hole 35 may be done. Otherwise this apparatus works in the same way as the one described before, except for the fact that regulating, opening and shutting off of the water under pressure to be admitted into the tube has to be done by the valve provided for the water hose to be connected with the tube.

In order to regulate the amount of water entering the nozzle 31, a particular choking structure may be applied shown in Figs. 5 and 6. It consists in a tube-like valve having a cylindrical part 37 and a conical part 38 fitting into a conical seat 34 at the entrance side of the nozzle 31. A handle 40 is connected with a stem 41 which fits snugly into the wall of the casing 30 and is connected with a crank-like part 42 the pivot of which enters a guiding path 43 formed on the valve 37. By turning the handle 40, the valve 38 may be pressed upon the seat 34 or removed from it, and thereby stopping and fully opening of the admission of water, and any intermediate choking of it is possible.

In this case the valve arranged in the hose must not be used for regulating the flow of water into the tube 10. The water entering the nozzle 31 through the more or less narrow channel between the seat 34 and the valve 38 will become turbulent enough so as to suck in a sufficient amount of water through the opening 28, if being released from the nozzle 31.

In the features described any means outside the tube are avoided driving the solution containing the foam promoting agent into the tube. The nozzles 22 and 33 are arranged within the nozzles 16 and 31, respectively, so that the water under pressure passing the nozzles 16 and 31, respectively, sucks in the solution containing the foam promoting agent through the nozzles 22 and 33, respectively. It is understood that additional means may be provided assisting such influx of the solution into the nozzles 22 and 33.

In the features according to Figs. 7, 8 nozzles injecting water in a direction inclined to the axis of the tube and additional nozzles concentrical with the tube are arranged. The foam promoting agent is led into the latter nozzle. 44 are the inclined nozzles communicating with passages 15, and 45 is the nozzle concentrically arranged with the tube 10. In this feature the rotatable cock 46 is provided with openings 17 in a number and position corresponding to that of the passages 15 in the casing 47. Furthermore, in the cock is formed the nozzle 45 in which another nozzle 53 runs, forming at its rear end an open connection with the space 49 on the entrance side of the tube. The foam promoting agent enters from the outside in the same way as shown in the other figures into a passage which runs into another passage 50 formed in the cock 46 and which runs into the chamber 51 of nozzle 45. In the front of nozzle 53 a flap 52 is arranged carried by an elastic plate 55 which is fastened on one end 54 to the cock, while the other end 48 glides on a cam 56 connected with the casing 47.

In operation, in the position of the handle 18 and the cock 46, according to Fig. 7, the openings 17 are in alignment with the passages 15, the flap 52 in its open position. The passage 50 is in alignment with the channel leading in the solution containing the foam promoting agent. Therefore, the water enters through the passages 17, 15 the nozzles 44 and is released in turbulent jets impinging upon each other. At the same time the water enters the nozzle 53 and sucks the solution containing the foam promoting agent into the chamber 51, wherefrom the mixture of the solution and the water is released through the nozzle 45 into the tube and mixes with the other jets released from the nozzles 44. In this arrangement the water under pressure can enter quite freely the nozzle 53, so that it sucks in very effectively the foam promoting agent.

In the position of the handle 18 and the cock 46 shown in Fig. 8, the passages 15 are closed, and in the same way the entrance to the nozzle 53 by the flap 52.

In the feature according to Fig. 9, walls 57 are inserted into the tube 10 having a cross section forming a cross or a star. These walls, extending longitudinally and concentrically over a substantial part of the tube 10, cause additional turbulence in the center of the mixture of water, containing the foam promoting agent, and air, whereby the formation of a very finely subdivided and steady foam is promoted. 58 may be jets of water already containing the foam promoting agent released through a slot 59, this water entering through the tube 60.

What I claim is:

1. An apparatus for producing a fire extinguishing foam comprising a tube having entrance and discharge ends, means for receiving a stream of quenching liquid under pressure and transforming it into at least one high velocity stream which is released into the interior of said tube toward its discharge end, means for introducing a foam promoting agent into said tube, inlet means for a gas adjacent said entrance end, means for controlling the volume of said quenching liquid entering said transforming means, said controlling means rotatably and permanently arranged within said entrance end in front of and in contact with said transforming means, so that said former means are pressed against said latter means by said quenching liquid when entering said tube.

2. An apparatus for producing a fire extinguishing foam, comprising a tube having entrance and discharge ends, nozzles for introducing at least one high velocity stream of quenching liquid and a foam promoting agent into the interior of said tube toward its discharge end, said nozzles arranged adjacent to said entrance end, inlets for a gas adjacent to said entrance end, the mouth of said nozzle introducing the foam promoting agent being arranged within a nozzle for introducing said liquid, means for simultaneously controlling the volumes of said liquid and said agent entering said nozzles arranged adjacent to and inside said entrance end, and a handle for actuating said controlling means from outside said tube.

3. In an apparatus according to claim 2, said controlling means for the stream being rotatively arranged and connected with said handle, said controlling means for the agent comprising a valve normally held in a resting position, and a curved surface provided between said two controlling means and operatively connected with one of them for moving said valve out of its resting position if said other controlling means are turned.

4. An apparatus for producing a fire extinguishing foam comprising a tube having entrance and discharge ends, nozzles for introducing at least one high velocity stream of quenching liquid and a foam promoting agent into the interior of said tube toward its discharge end, inlets for a gas adjacent to said entrance end, said nozzle for the agent movably arranged within said nozzle for the liquid and provided with a valve extension, a valve seat arranged at the inlet of said nozzle for the liquid and cooperating with said valve extension, and means controlled by a handle from outside said tube for actuating said movable nozzle.

WILHELM FRIEDRICH.